Dec. 4, 1956  H. T. TORNBERG  2,772,733
PIPE-CUTTING APPARATUS
Filed Nov. 30, 1955  3 Sheets-Sheet 1

INVENTOR,
Henning T. Tornberg
BY
Attorney

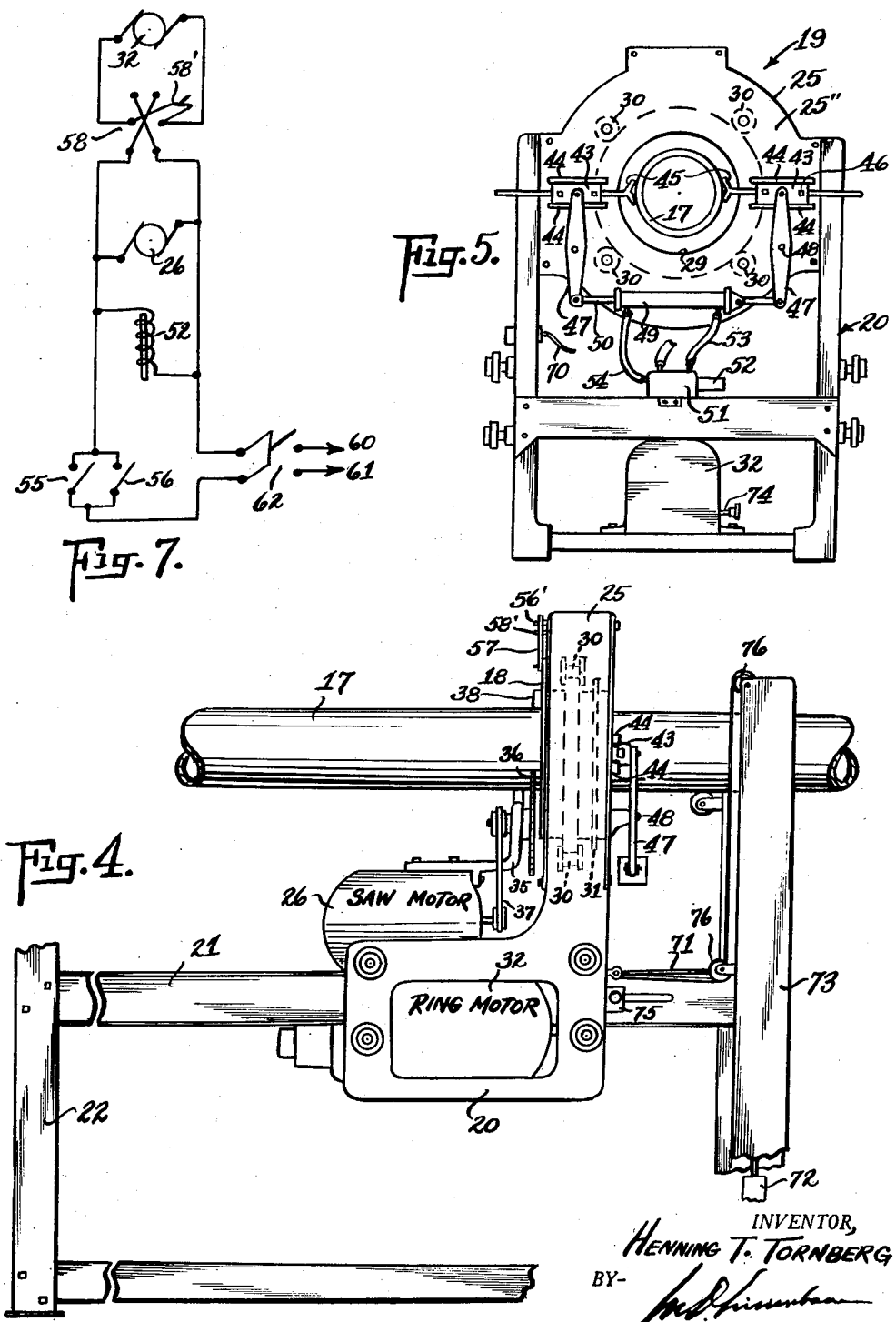

United States Patent Office 2,772,733
Patented Dec. 4, 1956

2,772,733
PIPE-CUTTING APPARATUS

Henning T. Tornberg, Ridgewood, N. J., assignor to Modern Plastic Machinery Corp., Lodi, N. J., a corporation of Delaware Application November 30, 1955, Serial No. 549,941

12 Claims. (Cl. 164—60)

The present invention relates to a machine for cutting pipe and tubing of all kinds and more particularly to the type where the cutting means revolves about the work being cut.

An object of this invention is to provide a novel and improved pipe and tube cutting machine of the type mentioned, affording easy adjustment of the cutting means in compliance with the size of the work to be cut.

Another object hereof is to provide a pipe-cutting machine of the character set forth, employing a motor-driven circular saw as the cutting means and since such motor must travel around the work, I make provision that the electric cord connecting the motor to a power supply will suffice without requiring slip rings and brush structure to convey power to said motor.

A further object hereof is to provide a novel and improved machine of the class described, for cutting pipe and the like into prescribed lengths while the work being cut is running along its length continuously, as for instance pipe being extruded; such machine being automatic in its operation.

Still a further object of this invention is to provide a novel and improved pipe cutting machine of the nature set forth, which is simple to adjust, using a single disc saw blade for all sizes of work and which is efficient in carrying out the purposes for which it is designed.

One of the forms this invention may assume is as follows:

The cutting head comprises a frame on which a ring is journalled. The hole in said ring is of a size to accommodate the largest diameter pipe therethrough for which the machine is designed. The frame carries means to clamp the pipe thereto when the pipe is through said ring and is adjustable for all sizes of pipe. When the pipe is mounted, it is concentric with said ring. On one face of the ring, the casing of an electric motor is pivotally mounted. The axis of such pivotal connection and the axis of the motor shaft are parallel to the axis of the ring. The motor casing has an arm extending in a direction laterally of its shaft. On said arm, spaced from the motor shaft is a rotatably mounted disc saw blade which is driven by belt or other suitable means by said motor. A cam follower is carried along with the motor casing about the said pivotal connection. The cam follower cooperates with a cam groove or track in the frame around the ring. Means are provided to adjust the position of the periphery of the saw with respect to the center of the ring so that such saw is out of contact but quite near the work. The nature of the cam track is to bring the saw through the work at commencement of rotation of the ring and keep it through the work until the pipe is cut through and then bring the saw back to initial rest position after the ring has made one revolution. There is a separate motor to turn the ring and switch means to control the circuits of the motors and the clamp operating means. To avoid the use of slip rings and brushes to bring power to the saw motor, the ring is rotated in opposite directions during successive cutting operations; there being a reversing switch for the ring turning motor, which is operated simultaneously with either of the switches which start or stop the motors. The switch means to start the motors is controlled by movement of the pipe. The switch means to stop the motors is controlled by movement of the ring.

Such cutting apparatus is adapted for use in machines for automatically cutting running pipe into prescribed lengths. In such instance, the cutting head is mounted on a carriage propelled forward by the continuously running pipe in the embodiment shown herein as occurs when the pipe is clamped, and when released from said clamp, the carriage returns by action of weights over pulleys. Carriage propulsion may of course be accomplished by a separate driving means if desired, as is already well known in the art. When the cutting head taught herein is used in such automatic machine, the starting switch means for the motors may be adjustably mounted on a stacker or collector of the cut-off pipe lengths as will be explained.

Also, the cutting head taught herein may be fixedly mounted and the pipe may be set therein by hand to be cut wherever desired.

In the accompanying drawings forming part of this specification, similar characters of reference indicate corresponding parts in all the views.

Fig. 4 is a longitudinal view of the cutter head which is mounted for reciprocation on a carriage.

Fig. 5 is a right end view of Fig. 4, showing in particular the pipe-clamping means.

Fig. 7 is a wiring diagram of the electrical system used for the control of operation of the ring and saw motors and the clamping means.

Figure 1:
Figs. 1, 2 and 3 are respectively longitudinal, top plan and end views showing in diagrammatic fashion the general scheme of the apparatus for cutting a running pipe in prescribed lengths automatically, of course, embodying the cutting head which is the subject of this invention.
Figure 2:
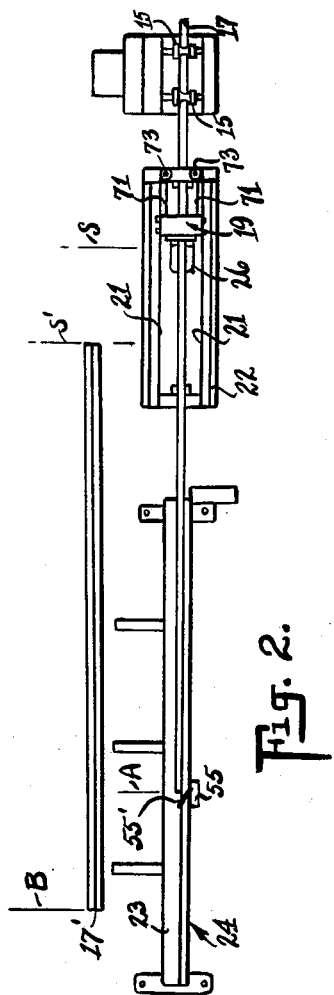
Figure 3:
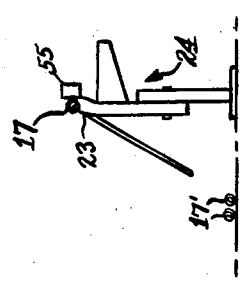

In the drawings, the numerals 15, 16 indicate driven rollers which pull a continuous supply of pipe 17, direct said pipe through the ring member 18 of the cutting head designated generally by the numeral 19 which is on a carriage 20 slidable to and fro on track rails 21 carried by a frame 22, and thence onto a receiving ledge 23 of a stacker 24 for collecting the cut lengths of pipe. The cutting head 19 may be a hollow casing 25, serving as a bearing for the ring member 18 which is suitably journalled for rotation. At least one end face 18' of said ring member is exposed, whereon is carried an electric motor 26, the casing of which is pivoted to said ring at 27; the axes of said ring 18, the motor shaft and said pivotal connection 27, being parallel. The face 25' of the casing or bearing 25, meaning the face of said bearing which is nearest the face 18' of said ring, is provided with a cam groove 28. Either the ring member 18 extends through the casing 25 as if a hollow shaft, or else, the casing wall 25'' is provided with an opening 29 about the size of the hole in the ring member. The ring 18 may be offered by a tubular form and the bearing therefor may be afforded by the rollers 30 within the housing 25. Ring member 18 carries a sprocket 31 so that said ring member can be driven by an electric motor 32 mounted on the carriage 20; the numeral 33 indicating the driving chain therefor.

The housing of the motor 26 is provided with two arms 34, 35 normal to its shaft axis. A disc saw 36 is rotatably mounted on the arm 34 about an axis parallel to such shaft axis and is driven by belt means 37. One end of a bar 38 is pivotally set on axis 27, and its other end carries a roller 39 which is engaged in the cam track or groove 28. The numerals 42 and 41 designate swivel blocks on said arm 35 and the bar 38 respectively. An adjustment screw 40 is threadly engaged in one of said blocks and journalled in the other. This permits adjustment of the angular relation between said components 35, 38 and rigidly holds them in any set angular relation. The motor 26, its extending arms 34, 35, the adjustment screw 40 and the bar 38 are positioned away from the hole of the ring member 18 so as not to interfere with the pipe 17 through such hole, and dimensions are such that the saw 36 may be in position away from such hole. The term "away" as used here means away from the wall of said ring hole. It is evident that when the angle between the components 35, 38 is decreased, the saw 36 is shifted away from the axis of the ring member 18 and brought nearer to such axis when said angular measurement is increased. This is to set the initial position of the saw for any particular size of pipe stock to be cut by the machine. The cam groove 28 is circular and concentric with the axis of the ring member 18, except for a rather short portion 28' which is arc-shaped with its crest extending towards ring axis. In rest position of the ring member 18, the cam roller 39 is at such crest of the cam groove portion 28'. The altitude of such arcual-shaped portion determines the extent of feed of the saw into the work 17, and such amount shall be greater than the pipe stock of thickest wall which is to be cut by the machine. With both motors 26 and 32 working, a single revolution of the ring member 18 is sufficient for cutting through the pipe 17.

The pipe clamping means is best seen in Fig. 5. The diametrically opposite slides 43 move along tracks offered by the bars 44 fixed on the casing or bearing 25 on the face 25" thereof. Gripping jaws 45 are slidably mounted in said slides respectively and can be adjusted and set by the screws 46 to accommodate any size of pipe the machine is designed to take. Intermediate their ends, the levers 47 are swingably mounted at 48 respectively on the casing 25. One end of each of these levers is linked pivotally to said slides 43 respectively. The other ends of said levers are pivotally linked to the cylinder 49 and its piston rod 50 respectively. This is a double action air cylinder controlled by valve means 51 operated by the action of an electric solenoid 52. When the solenoid is operated, the piston will travel in one direction because the valve 51 will direct compressed air into one end of the cylinder 49 through the hose 53. When the said solenoid is deactuated, its armature being spring-biased (not shown) will set the valve that compressed air will be fed to the other end of said cylinder through hose 54. This is well known in the machine art and needs no further showing or explanation. Other suitable clamping means may of course be employed in this machine, with suitable control means to open and close the gripping jaws 45.

If the cutting apparatus is to be used for a single size of pipe, the adjustment means effective by turning 40 may be omitted, in which instance the follower 39 may be deemed as it always is, carried along with the motor 26.

The electrical control system will now be discussed. Referring to Fig. 7, there is a normally open starting switch 55 which is adjustably positioned on the stacker 24. The operating member of this switch is in the path of the pipe 17. When the end of the pipe comes into contact with said operating member 55', it is shifted to set the switch in closed condition. Soon as a length of pipe is cut off, it will fall off the ledge 23, whereupon it will drop to 17' and the operating member will return to initial rest position whereby the said switch 55 is again in open condition.

Figure 6:
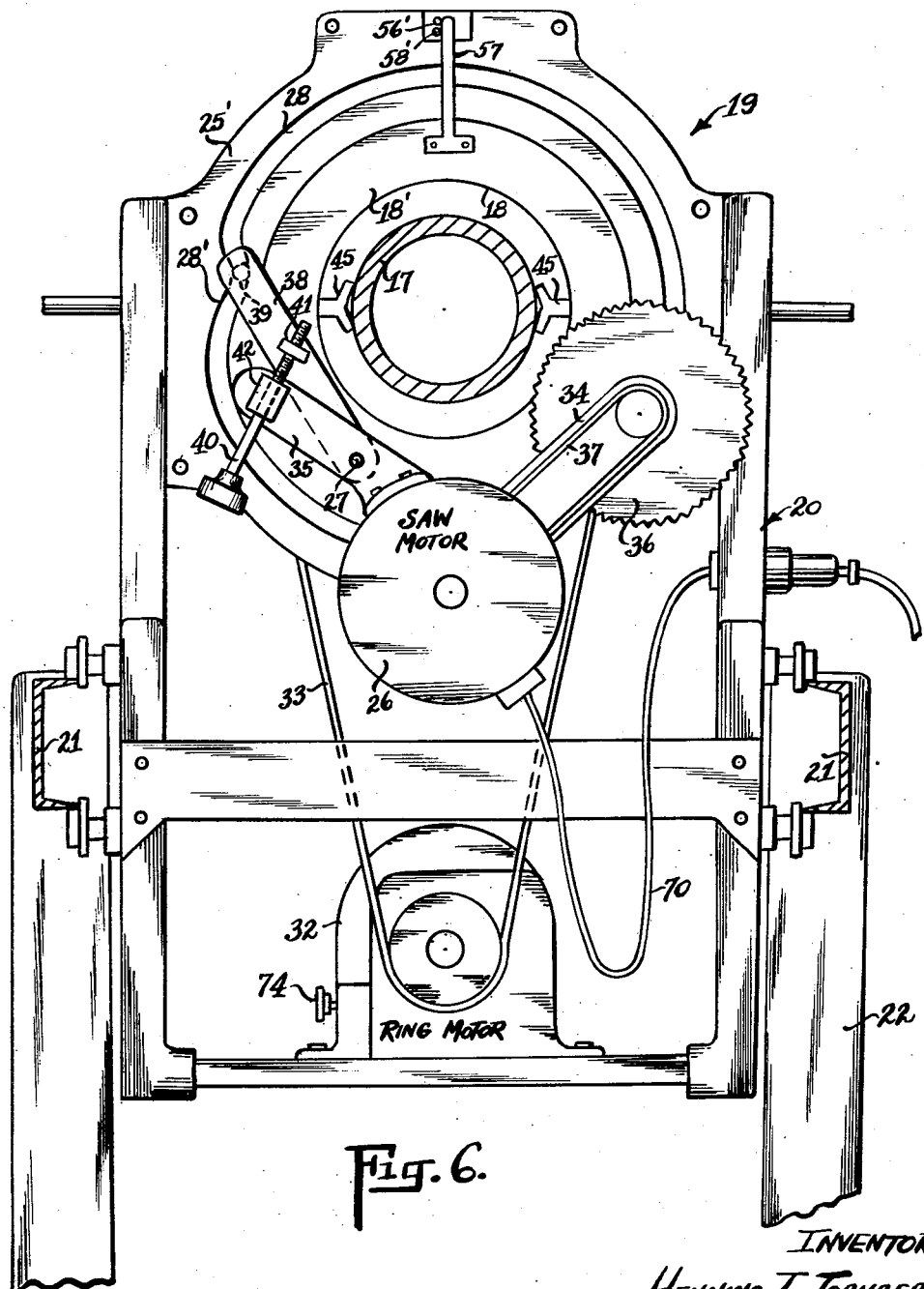
Fig. 6 is an enlarged left end view of Fig. 1, showing in particular the cutting means.

The numeral 56 indicates a normally closed switch whose operating member 56' is shifted by a finger 57 extending from the ring member 18, to open such switch 56. Said finger is in such position on the ring member that said switch 56 is in open condition when said ring member is in rest position shown in Fig. 6. Also operated by said finger 57 is a reversing switch 58 controlling the rotation of the ring-dring motor 32. The operating member 58' of this reversing switch is in the path of said finger which operated both switch 56 and 58 simultaneously. The reversing switch is of the known construction that it changes its setting with each operating shift of its operating member. The stopping switch 56 and the reversing switch 58 are both mounted no the cutting head bearing casing 25. Said switches 55 and 56 are connected in parallel and each is interposed in one of the power lines which power line is connected to one of the terminals of each of the saw-dring motor 26, the valve-operating solenoid 52 and the reversing switch 58. The other power line is connected to the other terminals of 26, 52, 58. The main power lines 60, 61 may be fed to the circuit and controlled by a master switch 62.

At initial rest condition of the machine, the starting switch 55 is open because its operating member 55' is free of the pipe 17. The stopping switch 56 is open, being so held by the finger 57. The reversing switch 58 is in condition whereby the motor 32 is connected for rotation in a given direction. The jaws 45 are away from and hence do not grip the pipe 17. No current flows to the motors 26, 32 or to the solenoid 52. Said motors and solenoid being in parallel electrical connection, they will all operate while either of the switches 55 or 56 is closed and none of them will operate when both said switches are open. When said solenoid is actuated, the jaws 45 are shifted to grip the pipe. Since the pipe is running towards the left in Fig. 1, the carriage 20 will move along with the gripped pipe. Upon release of the pipe 17 from the grip of said jaws, the carriage will be brought back to its initial rest position by action of the weights 72. The numeral 75 denotes a sop which is adjustably positionable along the track 21 to limit carriage movement towards the right and thus determine initial rest position for said carriage 20. The starting switch 55 is positionable anywhere along the ledge 23. The speed of the motor 32 is adjustable by means of a speed changing device operated by turning the shaft 74. The position of the saw 36 is adjustable by turning the member 40, to fit pipe diameter. The jaws 45 are adjustable in their respective slides 43 by means of the set screws 46. To set the machine for any operation, all the above adjustments are made to suit pipe size and speed and the pipe length to be cut off.

At initial rest position of the carriage 20, the saw 36 is at line S. The line S' indicates saw position when the carriage has traveled its full scope towards the left. At the completion of such travel, the ring 18 has been turned one revolution. The starting switch 55 is set at such a position that when it is first closed by the free end of the pipe 17, the ring 18 will make one revolution when such end of the pipe reaches line B; such position of the switch 55 is indicated by the line A. It is evident that the distance between the lines S' and B, is the length of pipe to be cut off. To set the machine for operation, all the mentioned adjustments are made to suit the pipe size, pipe speed and the length of pipe to be cut off.

To operate the machine, the master switch 62 is closed. A continuous supply of pipe 17 is fed through the ring 18 by operation of the driven feed rollers 15, 16. The supply of pipe will come upon and move along the ledge 23 of the stacker 24. As soon as the free end of the pipe 17 will contact the operating member 55' of the starting switch 55 to set said switch into closed condition, the pipe 17 will be gripped by the jaws 45, the saw will operate and the ring 18 will turn. The saw will be thrust through the pipe wall because the cam follower 39 will leave cam track portion 28'; the actuation of the saw and ring being due to the operation of the motors 26 and 32. Finger 57, in releasing the operating member 56', will cause switch 56 to be closed. When the saw 36 comes to line S', the pipe is cut through and will fall off the ledge 23 to position 17'. The ring 18 having made one complete revolution, finger 57 will engage operating member 56' causing switch 56 to be set in open condition.

There being no pipe effecting the operating member of switch 55, the latter will be in open condition. The finger 57 will also have shifted the operating member 58' to cause motor 32 to be in such connection in the circuit, that upon the next actuation of such motor, it will turn in reverse direction. It is evident that upon the opening of both switches 55 and 56, the motors 26 and 32 will stop and the clamping jaws 45 will move away to release the pipe. It is to be noted that as soon as the pipe 17 was gripped by said jaws at the commencement of the cycle of operation, the movement of the pipe carried the carriage 20 along with it towards the left in Fig. 1, but as soon as the pipe was cut off and the jaws moved to release their grip on the pipe, that the carriage 20 was brought back to initial rest position by action of the weights 72 which are connected by cables 71 to the carriage 20, over suitable pulleys 76 on the upright tubes 73 which are mounted to frame 22, and house the weights and part of the cables respectively. There being a continuous supply of pipe in movement towards the stacker 24, it is evident that the machine will commence another cycle of operation as soon as the traveling pipe again closes the starting switch 55, and such cycle will automatically repeat itself as long as a suply of pipe continues. Since the motor 32 turns in opposite directions in succeeding cycles of operation, the electric cord 70 connecting the saw motor 26 will suffice and the necessity of brushes and slip rings for bringing power to said motor 32, is eliminated. Said cord 70 need only be long enough to permit one revolution of the motor 26 about the pipe 17. If the motor 32 were not reversed as herein provided for each cycle of operation, said cord 70 could not be used and brushes and slip rings or other structure of their nature would be mandatory. The saw 36 has symmetrical V-shaped teeth so that such saw will cut the pipe regardless of the direction of rotation of the ring 18.

The cutting head 19 and its associated control mechanism, can of course be used to cut through pipe which is at rest. The carriage 20 in the embodiment illustrated, remains at rest or may be secured to frame. If automatic repetition of operation is not desired, the provision of the carriage is of course dispensed with and the apparatus is permanently fixed to frame or on a suitable stand or table. Of course, in such instance, the pipe is fed by hand, that is the pipe is positioned by hand to be cut off at line S. A suitable stop, not shown, may be provided for the free end of the pipe to rest against. Such stop may be made part of the starting switch 55 arranged that the free end of the pipe shall come to said stop when it causes the switch 55 to be closed. Such stop may be independent of said switch 55 which may be anywhere, and of course when not actuated by pipe positioning, needs to be closed by hand and held closed until the machine starts to operate. Upon completion of the cycle of operation, the stopping switch 56 will be opened by action of the finger 57, whereupon the motors 26 and 32 will stop and the jaws 45 will move apart to release the pipe 17. The apparatus is now ready to repeat its operation.

This invention is capable of numerous forms and various applications without departing from the essential features herein set forth. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In a pipe-cutting apparatus of the character described, a member having an opening therethrough, a ring rotatably mounted on said member whereby a pipe may be positioned through said opening and said ring, means on said member to releasably hold said pipe secured to said member, means to rotate the ring, an electric motor pivotally mounted on the ring, a cutting element driven by said motor and carried along therewith; the axes of the ring, the motor shaft and the pivotal connection of the motor on the ring being in parallel spaced relation, a cam track on said member endlessly around said opening and a cam track follower carried along by the motor and in engagement with said track to pivot the motor and saw toward and away from the axis of the pipe; the nature of said track being such that upon rotation of said ring, the cutting element will be moved towards the axis of the ring at the commencement of rotation of said ring and moved away from the axis of said ring at the conclusion of one revolution of said ring.

2. The apparatus as defined in claim 1, wherein the cutting element is a rotatably mounted disc blade.

3. The apparatus as defined in claim 1, including means carried on the motor to alter the position of the cam track follower radially of the ring.

4. The apparatus as defined in claim 1, including an arm extending from the motor and a second arm pivotally mounted on the ring; said arms being in angular relation in a direction across the ring and the cam track follower being carried by the second arm and means for altering the angle between said arms being carried on both said arms.

5. The apparatus as defined in claim 4, wherein the motor and the second arm are pivotally connected to the ring on a common axis.

6. The apparatus as defined in claim 1, including two arms extending from the motor; the cam track follower being carried on one of said arms and the cutting element being movably mounted on the second of said arms.

7. The apparatus as defined in claim 1, including a first and a second arm extending from the motor and a third arm pivotally mounted on the ring; the cutting element being movably carried on the first arm and the cam track follower being carried on the third arm; the second and third arms being in angular relation in a direction across the ring and including means for altering the angle between the second and third arms being carried on both such arms.

8. The apparatus as defined in claim 7, wherein the motor and the third arm are pivotally mounted on the ring on a common axis.

9. The apparatus as defined in claim 1, wherein the means to rotate the ring is an electric motor including a reversing switch in its electrical circuit and including means controlled by the rotary movement of the ring to operate such reversing switch at the end of a predetermined amount of turning of such ring and including an electrical conductor flexible in nature connecting said motor in the circuit; the length of said conductor being such that it would be damaged by unlimited rotation of the ring.

10. The apparatus as defined in claim 9, wherein the amount of turning is one revolution.

11. The apparatus as defined in claim 9, including a normally open switch and a normally closed switch connected in electrical parallel relation in the circuit of the electric motor which rotates the ring and in such manner that said two switches control the circuit of such motor; the normally opened switch being so positioned that it is adapted to be closed by the free end of the pipe when such pipe is moved through the ring to extend a predetermined distance therefrom and including means controlled by the rotary movement of the ring, holding the normally closed switch in open condition when the ring is at rest and when the ring is turned a predetermined amount from its rest position.

12. The apparatus as defined in claim 11, wherein the amount of turning is one revolution.

References Cited in the file of this patent

UNITED STATES PATENTS

| | | |
|---|---|---|
| 2,168,853 | Abbey | Aug. 8, 1939 |
| 2,692,021 | Nygren | Oct. 19, 1954 |